(12) United States Patent
Wiggs

(10) Patent No.: US 6,789,608 B1
(45) Date of Patent: Sep. 14, 2004

(54) THERMALLY EXPOSED, CENTRALLY INSULATED GEOTHERMAL HEAT EXCHANGE UNIT

(76) Inventor: B. Ryland Wiggs, 425 Sims La., Franklin, TN (US) 37069

( * ) Notice: Subject to any disclaimer, the term of this patent is extended or adjusted under 35 U.S.C. 154(b) by 10 days.

(21) Appl. No.: 10/127,517

(22) Filed: Apr. 22, 2002

(51) Int. Cl.$^7$ ............................................. F28D 21/00
(52) U.S. Cl. ......................................... 165/45; 62/260
(58) Field of Search .............................. 165/45; 62/260

(56) References Cited

U.S. PATENT DOCUMENTS

| | | | | |
|---|---|---|---|---|
| 3,452,813 A | * | 7/1969 | Watkins et al. | 165/45 |
| 4,010,731 A | * | 3/1977 | Harrison | 126/620 |
| 4,094,356 A | * | 6/1978 | Ash et al. | 165/45 |
| 4,290,266 A | * | 9/1981 | Twite et al. | 165/45 |
| 4,715,429 A | * | 12/1987 | Mogensen | 165/45 |
| 4,741,388 A | | 5/1988 | Kuroiwa | |
| 4,867,229 A | * | 9/1989 | Mogensen | 165/45 |
| 5,224,357 A | * | 7/1993 | Galiyano et al. | 62/260 |
| 5,461,876 A | | 10/1995 | Dressler | |
| 5,623,986 A | | 4/1997 | Wiggs | |
| 5,816,314 A | | 10/1998 | Wiggs et al. | |

* cited by examiner

Primary Examiner—Leonard Leo
(74) Attorney, Agent, or Firm—Waddey & Patterson; Mark J. Patterson

(57) ABSTRACT

A thermally exposed centrally insulated geothermal heat exchange unit, which can be placed in ground and/or in water, consisting of at least one fluid supply line and at least one fluid return line, which lines are respectively separated by a thermal insulation material, but which lines are otherwise in thermal contact with their respective adjacent subsurface earth and/or water surroundings by means of a heat conductive fill material inserted as necessary to fill any void space in the respective fluid transport line location areas situated between the thermal insulation material and the adjacent earth and/or water. When the unit is situated within a geothermal borehole, the thermal insulation material may have an expanded central area so as to decrease the amount of necessary heat conductive fill and so as to increase insulation efficiency. The length of the insulation material within a borehole should be at least four times the diameter of the largest fluid transfer line, or lines, and should extend across the entire width of the borehole in all cases where the minimum design length is exceeded, unless a small width is left at each respective perimeter for the fill to seal out potentially corrosive elements. The width of the insulation material within a borehole should not exceed one-third the diameter of the borehole.

15 Claims, 4 Drawing Sheets

US 6,789,608 B1

THERMALLY EXPOSED, CENTRALLY INSULATED GEOTHERMAL HEAT EXCHANGE UNIT

APPLICATION FOR UNITED STATES LETTERS PATENT

Be it known that I, B. Ryland Wiggs, 425 Sims Lane, Franklin, Tenn. 37069, have invented a new and useful "Thermally Exposed, Centrally Insulated Geothermal Heat Exchange Unit".

A portion of the disclosure of this patent document contains material that is subject to copyright protection. The copyright owner has no objection to the facsimile reproduction by anyone of the patent document or the patent disclosure, as it appears in the Patent and Trademark office patent file or records, but otherwise reserves all copyright rights whatsoever.

BACKGROUND OF THE INVENTION

The present invention relates to an improved in-ground/in-water heat exchange means for use in use in association with any heating/cooling system and/or any geothermal thermal energy generation system utilizing in-ground and/or in-water heat exchange elements as a primary or supplemental source of heat transfer.

Ground source/water source heat exchange systems typically utilize fluid-filled closed loops of tubing buried in the ground, or submerged in a body of water, so as to either absorb heat from, or to reject heat into, the naturally occurring geothermal mass and/or water surrounding the buried or submerged tubing. Water-source heating/cooling systems typically circulate water, or water with anti-freeze, in plastic underground geothermal tubing so as to transfer heat to or from the ground, with a second heat exchange step utilizing a refrigerant to transfer heat to or from the water, and with a third heat exchange step utilizing an electric fan to transfer heat to or from the refrigerant to heat or cool interior air space. Direct expansion ground source heat exchange systems typically circulate a refrigerant fluid, such as R-22, in copper underground geothermal tubing to transfer heat to or from the ground, and only require a second heat exchange step to transfer heat to or from the interior air space by means of an electric fan.

While most in-ground/in-water heat exchange designs are feasible, various improvements have been developed intended to enhance overall system operational efficiencies. Several such design improvements are taught in U.S. Pat. No. 5,623,986 to Wiggs, and in U.S. Pat. No. 5,816,314 to Wiggs, et al., the disclosures of which are incorporated herein by reference. These designs basically teach the utilization of a spiraled fluid supply line subjected to naturally surrounding geothermal temperatures, with a fully insulated fluid return line.

Other predecessor vertically oriented geothermal heat exchange designs are disclosed by U.S. Pat. No. 5,461,876 to Dressler, and by U.S. Pat. No. 4,741,388 to Kuriowa. Dressler's "876" patent teaches the utilization of an in-ground spiraled fluid supply line, but neglects to insulate the fluid return line, thereby subjecting the heat gained or lost by the exiting circulating fluid to a "short-circuiting" effect as the return line comes in close contact with the warmest or coldest portion of the entering fluid supply line. Kuriowa's preceding "388" patent is virtually identical to Dressler's subsequent claim, but better, because Kuriowa insulates a portion of the return line, via surrounding it with insulation, thereby helping to reduce the "short-circuiting" effect. Dressler's "876" patent also discloses the alternative use of a pair of concentric tubes, with one tube being within the core of the other, with the inner tube surrounded by insulation or a vacuum. While this multiple concentric tube design reduces the "short-circuiting" effect, it is practically difficult to build and could be functionally cost-prohibitive.

The disadvantage encountered with insulating the heat transfer return line, by means of fully surrounding a portion of same with insulation as per Kuriowa, or by means of a fully insulated concentric tube within a tube as per Dressler, or by means of a fully insulated return line as per Wiggs' predecessor designs, is that the fully insulated portion of the return line is not exposed to naturally occurring geothermal temperatures, and is therefore a costly necessary underground/underwater system component which is not capable of being utilized for geothermal heat transfer purposes. While the utilization of such fully insulated costly components is an improvement over prior totally un-insulated geothermal heat transfer line designs subject to a "short-circuiting" of the maximum heat gain/loss potential, a design which insulates the supply line from the return line and still permits both lines to retain natural geothermal heat exchange exposure would be preferable.

SUMMARY OF THE INVENTION

It is an object of the present invention to further enhance and improve the efficiency and installation cost functionality of predecessor geothermal heat exchange designs. This is accomplished by means of insulating the underground and/or underwater heat transfer fluid supply line, or lines, from the fluid return line, or lines, while still providing for natural geothermal heat exchange exposure along the entire length of both the supply line, or lines, and the return line, or lines.

To accomplish this objective, in a vertically oriented borehole for example, insulation, which is non-corrosive to fluid supply and return line tubing, is inserted between the supply line, or lines, and the return line, or lines, across the entire central diameter of the hole, with the supply line, or lines, on one side of the centrally located insulation, and the return line, or lines, on the other side. The borehole may be an open hole drilled into the ground, or may be a hole drilled into the ground within which a heat conductive casing, such as a metal water-well casing, is placed along the exterior perimeter of the hole, directly adjacent to, and in thermal contact with, the ground. Each respective side of the centrally located insulation, containing the respective supply and return lines, would then be filled with a non-corrosive, heat conductive, fill material, such as a thermal grout 85 mixture. As a result, during system operation, the supply and the return lines will each transfer heat to or from their respective surrounding non-corrosive, heat conductive, fill material, with both the respective supply and return lines and their respective surrounding non-corrosive, heat conductive, fill material separated from each other by insulation. In turn, each respective combination of heat exchange line and its surrounding non-corrosive, heat conductive, fill material will transfer heat to or from the adjacent sub-surface ground and/or water. If the insulation width at the exterior edge of the borehole does not exceed one-third of the borehole's diameter, each respective combination of heat exchange line and its surrounding non-corrosive, heat conductive, fill material will be exposed to about 140 degrees of earth and/or water, for geothermal heat exchange purposes, for the entire depth and/or length of the borehole, absent any material "short circuiting" effect. The earth on the opposite sides of the centrally insulated borehole will be relatively unaffected by the heat transfer on the other side so long as the central insulation, separating the supply and return lines, extends for the greater distance, as measured from one side of the borehole to the other, of at least three times, and preferably four times, the diameter of the largest geothermal fluid transfer line, and at least three times, and preferably four times, the combined diameter of the largest multiple fluid transfer lines on either respective side of the central insulation. The width of separating insulation will generally be restricted by the borehole width, consequently, the borehole should be drilled at a diameter of sufficient width to accommodate at least this minimum insulation distance.

An additional advantage of surrounding the copper refrigerant supply and return lines with a non-corrosive, thermally conductive, fill material, such as a thermal grout 85 mixture, is that it eliminates the necessity for cathodic protection of the in-ground copper if the soil and/or ground water is too acidic, less than a 5.5 pH, or too basic, greater than a 12 pH. In the event corrosive soil and/or water is encountered, the centrally located separating insulation should only extend to within one-half inch to one inch of the outside perimeter of the borehole so as to permit the thermally conductive fill material to fully enclose and encapsulate the supply and the return lines as well as the central insulation, forming a complete protective exterior shell against corrosive elements which could otherwise potentially migrate to the supply and return lines. Even though some minimal heat migration between the supply and the return lines will occur as a result of the connected one-half inch to one inch thermally conductive fill material along the outside perimeter of the borehole, such a minimal "short circuiting" effect will be relatively insignificant, and this minor disadvantage will be more than offset by this highly advantageous and effective means of insuring the supply and return lines will not become corroded, which could result in overall system operational failure by means of leaks in one or both of the supply and return lines. Utilization of at least a one-half inch thick non-corrosive, thermally conductive, fill material to protect the fluid transport lines against potentially corrosive sub-surface conditions, as described above, is a better and improved method over a simple thin coating of the fluid transport tubes with a non-corrosive substance. This is because one small pinhole prick in a simple thin coating will totally invalidate the intended protective integrity in a sub-surface corrosive environment.

The insulation area between the supply and return lines at the center of the borehole may be optionally expanded in area so as to reduce the amount of heat conductive fill required, and so as to increase thermal insulation quality. Other than at any such optionally expanded insulated center of the borehole, it is also important not to exceed an insulation width of more than one-third the diameter of the borehole on each respective side where the insulation contacts the ground, or where the insulation meets the borehole encasement piping which is directly adjacent to the ground, at the exterior side of the borehole. Otherwise, the advantageous expanded ground surface contact area, resulting from the heat conductive fill material surrounding the respective fluid transfer lines, will be unduly impaired. With a per side borehole insulation width equal to one-third of the borehole's diameter, there will still be about 77.7% of the 180 degrees per respective circumference side of the borehole available for geothermal heat transfer, or about 140 respective available circumference degrees per respective side available for geothermal heat transfer.

In order to avoid adverse geothermal heat transfer affects as a result of near-surface heat conditions, such as frosting in the winter and scorching in the summer, both the supply and the return subterranean fluid transfer lines should be fully insulated from between two to ten feet below the frost and/or the heat line in any geographic location. All above-ground fluid supply lines and all above-ground fluid return lines should be fully insulated with rubatex or the like. As these near-surface insulation procedures are both customary and obvious, such near-surface insulation procedures are not shown in the drawings.

For a direct expansion system, this invention will additionally easily permit the installation of a smaller liquid line on one side of the central insulation and the installation of a larger vapor line on the other side, with both lines exposed to the sub-surface ground and/or water, thereby facilitating a reverse cycle operation in both the heating and the cooling modes where the refrigerant flow reverses direction, depending on the desired heating or cooling mode performance. For example, in the heating mode, the ground's natural geothermal heat content operates as the evaporator, with the cold liquid refrigerant flowing into the smaller liquid line and the warmed refrigerant vapor flowing out the larger vapor line. In the cooling mode, the ground's natural geothermal heat content operates as the condenser, with the hot refrigerant vapor flowing into the larger vapor line and the cooled liquid refrigerant flowing out the smaller liquid line.

In a deep borehole direct expansion application, beyond 50 to 100 feet deep, a well-known oil-separator should be attached to the system's compressor unit so as to prevent loss of internal compressor lubricating oil into the low geothermal line at the bottom of the borehole. As the use of an oil-separator to prevent loss of compressor lubrication into fluid supply and return lines is well-known, this aspect is not shown in the drawings. Other customary direct expansion refrigerant system apparatus and materials would be utilized in a direct expansion system application, including a receiver, a thermal expansion valve, an accumulator, and an air-handler, for example as described in U.S. Pat. No. 5,946,928 to Wiggs, all of which are well-known to those in the trade.

The subject invention may be utilized as an individual unit, or by means of multiple units connected by tubing in series or in parallel so as to avoid excessively deep applications. As the manner of connecting multiple units in series or in parallel by means of tubing would be readily understood by those skilled in the trade, this aspect is not shown in the drawings. The subject invention may be utilized as a sub-surface heat exchange unit to increase operational efficiencies and/or to reduce installation costs in a number of applications, such as in a conventional geothermal closed-loop water-source heat pump system, in a conventional geothermal direct expansion heat pump system, as a supplement to a conventional air-source heat pump system, or the like. The invention may also be utilized to assist in efficiently heating or cooling air by means of a forced air heating/cooling system, or may be utilized to assist in efficiently heating or cooling water in a hydronic heating/cooling system.

The subject invention may be installed in a variety of optional manners, such as in a borehole, inside of a casing placed within a borehole, inside of a lateral or angled trench, inside of a casing placed within a lateral or angled trench, inside of a casing placed in water, or in any other like or similar manner. If the subject invention is placed within a casing, which casing is installed in the ground or in the water, the lower bottom end of the casing should be capped and sealed so as to assist in preventing any potentially corrosive soil and/or water from migrating to the supply and return lines within the sub-surface portion of the casing.

BRIEF DESCRIPTION OF THE DRAWINGS

There are shown in the drawings embodiments of the invention as presently preferred. It should be understood, however, that since any number of insulation methods between the geothermal supply line, or lines, and the geothermal return line, or lines, may be employed, the invention is not limited to the simple exemplary arrangements and instrumentalities shown in the drawings, which demonstrate only a single fluid supply line and a single fluid return line with simple insulation between them, which lines are surrounded by a thermally conductive fill material in direct thermal contact with the sub-surface ground, which sub-surface ground could also be comprised of a combination of ground and water, or of water alone, wherein.

DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
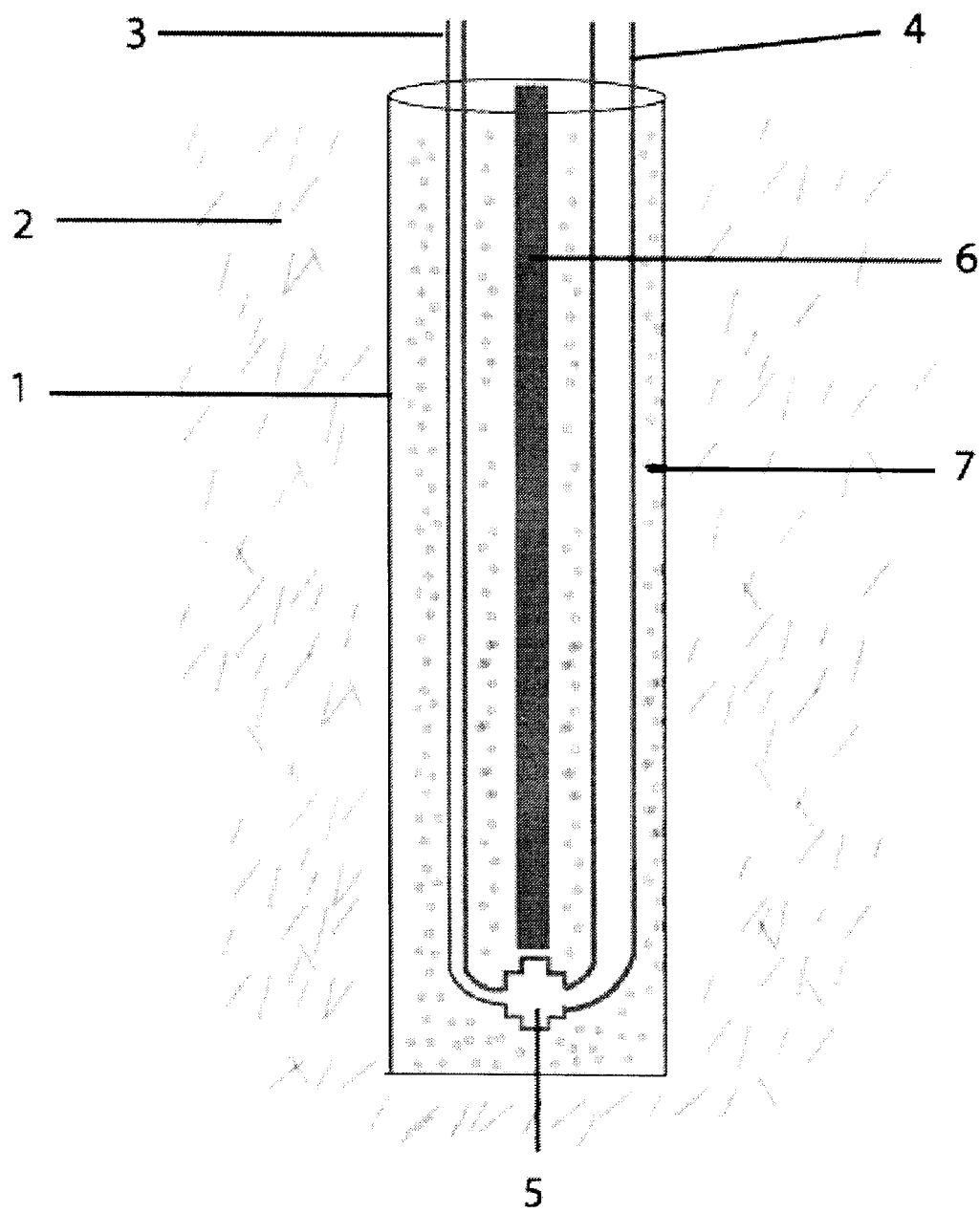
FIG. 1 is a side isometric view of a borehole in the ground with a geothermal fluid supply line and a geothermal fluid return line, where the two respective lines are separated by insulation extending across the diameter of the borehole, and where both respective otherwise void spaces in the borehole containing the two respective lines are filled with a non-corrosive, heat conductive fill material which fully encases both the fluid supply and the fluid return lines.

Referring now to the drawings in detail, where like numerals refer to like parts or elements, there is shown in FIG. 1 a side isometric view of a borehole 1 in the ground 2 with a geothermal fluid supply line 3 and a geothermal fluid return line 4. The supply line 3 and the return line 4 may be interchangeable in a reverse cycle system operation. The supply line 3 and the return line 4 may be of the same or differing sizes, depending on system design. For example, in a three ton direct expansion reverse cycle system design, the fluid supply line 3 in the heating mode may be a ½ inch O.D. liquid refrigerant transport copper tube, and the fluid return line 4 may be a ⅞ inch O.D. vapor refrigerant transport copper tube. In the cooling mode, the direction of the refrigerant flow in the geothermal lines simply reverses direction. If the supply line 3 and the return line 4 are of differing sizes, a conventional line coupling devise 5 is utilized to couple the two lines. Here, the single supply line 3 and the single return line 4 are shown as being two different sizes, with the coupling devise 5 located at the bottom of the borehole 1. However, depending on system design, the coupling devise 5 can be located at any desired position, and there may be more than one supply line 3 and/or more than one return line 4.

A segment of insulation 6 is shown extending across the entire central diameter of the borehole 1, thereby thermally isolating the supply line 3 and its respective surrounding non-corrosive, heat conductive, fill material 7 from the return line 4 and its respective surrounding non-corrosive, heat conductive, fill material 7. The insulation 6 may be composed of any material or design exhibiting adequate thermal insulation properties, such as styrofoam and/or wood and/or a vacuum tube and/or rubatex and/or hollow or insulation-filled plastic tubing, or the like. The respective portions of the borehole 1, containing the supply line 3 and the return line 4, are respectively filled with a non-corrosive, heat conductive, fill material 7, such as cement, concrete, a fluid, a gel, powdered stone, grout, thermal grout 85, or the like. Since the fluid transport lines 3 and 4 are respectively in direct thermal contact with heat conductive fill material 7, heat is transferred to or from the ground 2, located directly adjacent to each side of the borehole 1, through the non-corrosive, heat conductive, fill material 7 on each respective side of the central insulation 6, to or from the respective fluid supply line 3 and fluid return line 4, thereby effecting the desired geothermal heat transfer.

Figure 2:
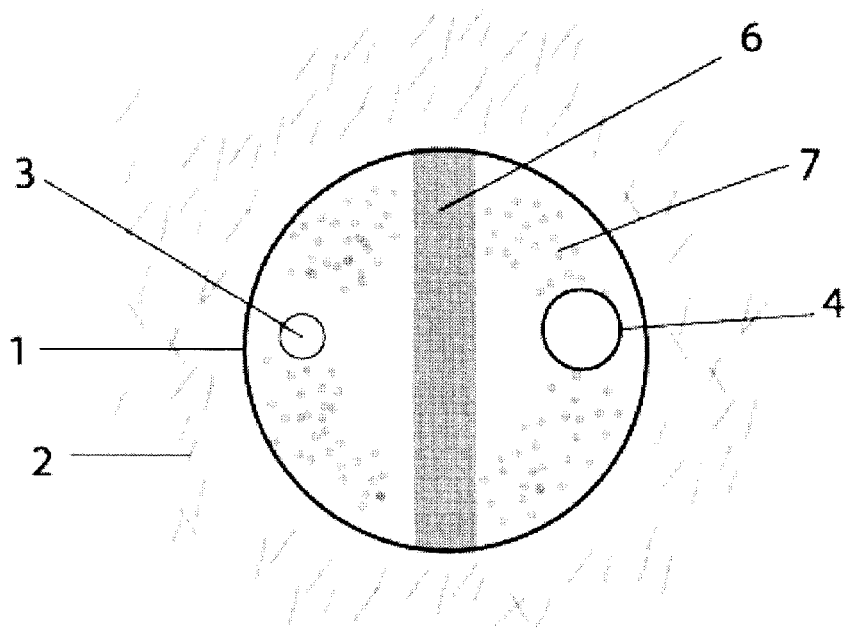
FIG. 2 is a top isometric view of a borehole in the ground with a geothermal supply line and a geothermal return line, where the two respective lines are separated by insulation extending across the diameter of the borehole, and where both respective otherwise void spaces in the borehole containing the two respective lines are filled with a non-corrosive, heat conductive, fill material.

FIG. 2 shows a top isometric view of the borehole 1, the surrounding ground 2, the fluid supply line 3 and the fluid return line 4 respectively encased in non-corrosive, heat conductive fill material 7, with a centrally located uniform width of insulation 6, such as styrofoam, rubatex, or the like, extending across the entire central diameter of the borehole 1, thermally isolating the two respective sides of the borehole 1, which contains the respective fluid transport lines 3 and 4.

Figure 3:
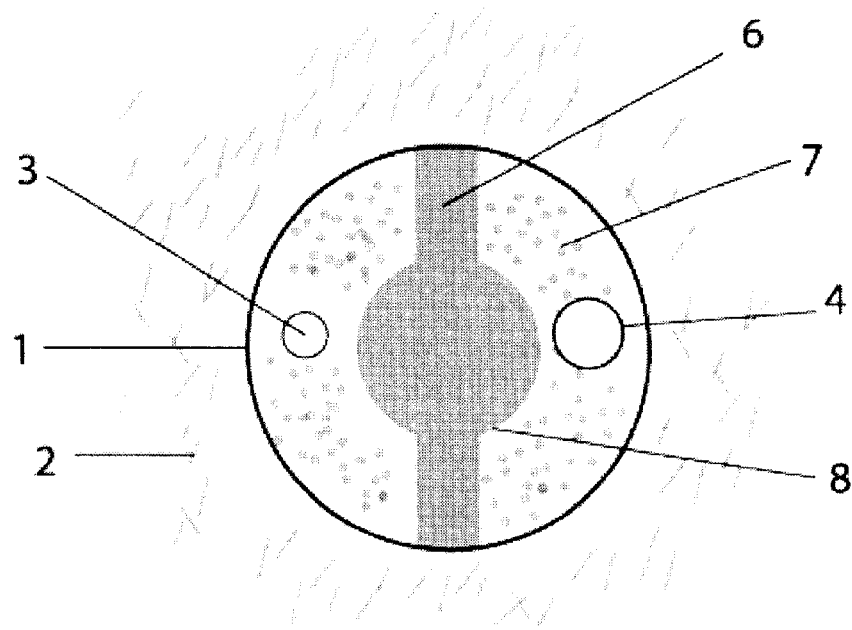
FIG. 3 is a top isometric view of centrally located insulation within a borehole, which insulation separates the fluid supply line and its non-corrosive, heat conductive, fill encasement from the fluid return line and its respective non-corrosive, heat conductive fill encasement, with the centrally located insulation comprised of an expanded-size insulating center with insulation extending to the outer rims of the borehole.

FIG. 3 shows a top isometric view of a design where the centrally positioned insulation 6, which traverses the entire diameter of the borehole 1, may alternatively consist of insulation 6 with an expanded-size insulating center 8. The expanded-size insulating center 8 may be comprised of an insulation-filled plastic tube or the like. An insulation 6 design with an expanded-size insulating center 8 effectively reduces the requisite amount of non-corrosive, heat conductive fill material 7 necessary to fill any void spaces between the ground 2 and the insulation 6 where the respective supply line 3 and the return line 4 are located, thereby decreasing fill material 7 costs, while simultaneously increasing insulation 6 effectiveness. Although the expanded-size insulating center 8 is shown here as being an insulation-filled tube, it may alternatively be a vacuum tube, or it may even simply be a tube filled only with air and sealed, since stationary air is a relatively poor heat conductor. The expanded-size insulating center 8 does not have to be in the shape of a tube, and can be in any form which accomplishes the two objectives of reducing the necessary amount of heat conductive fill material and enhancing the insulating abilities of the subject insulation 6.

Figure 4:
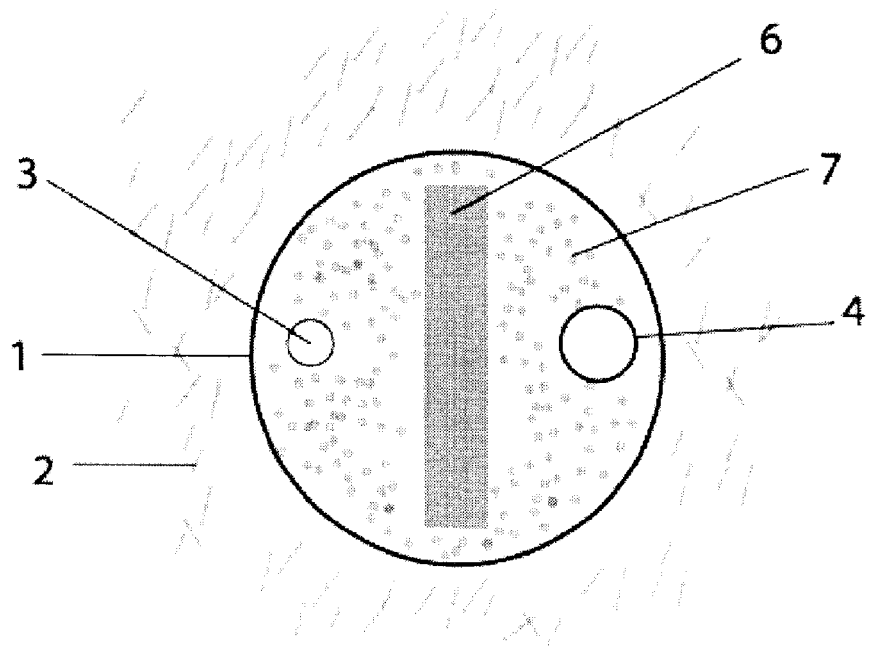
FIG. 4 is a top isometric view of a borehole in the ground with a geothermal fluid supply line and a geothermal fluid return line, where the two respective lines are separated by insulation extending across the diameter of the borehole, except for one-half inch to one inch at each respective side of the borehole, and where both respective otherwise void spaces in the borehole containing the two respective lines are filled with a non-corrosive, heat conductive fill material.

FIG. 4 shows a top isometric view of a borehole 1 in the ground 2 with a geothermal fluid supply line 3 and a geothermal fluid return line 4, where the two respective lines, 3 and 4, are separated by insulation 6 extending across the diameter of the borehole 1, except for one-half inch to one inch at each respective side of the borehole 1, and where both respective otherwise void spaces in the borehole 1 containing the two respective lines, 3 and 4, are filled with a non-corrosive, heat conductive, fill material 7.

Figure 5:
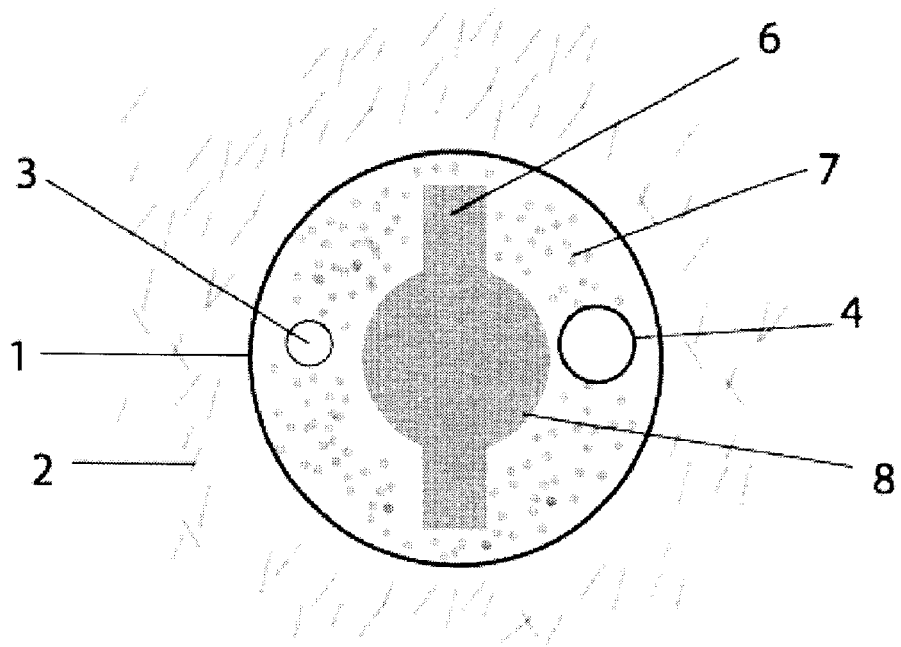
FIG. 5 is a top isometric view of centrally located insulation within a borehole in the ground, which insulation separates the fluid supply line and its non-corrosive, heat conductive, fill material encasement from the fluid return line and its respective non-corrosive, heat conductive fill material encasement, with the centrally located insulation comprised of an expanded-size insulating center with insulation extending to the outer rims of the borehole, except for one-half inch to one inch at each respective side of the borehole.

FIG. 5 shows a top isometric view of centrally located insulation 6 within a borehole 1 in the ground 2, which insulation 6 separates the fluid supply line 3 and its non-corrosive, heat conductive, fill material 7 encasement from the fluid return line 4 and its respective non-corrosive, heat conductive fill material 7 encasement, with the centrally located insulation 6 comprised of an expanded-size insulating center 8 with insulation 6 extending to the outer rims of the borehole 1, except for one-half inch to one inch at each respective side of the borehole 1.

Figure 6:
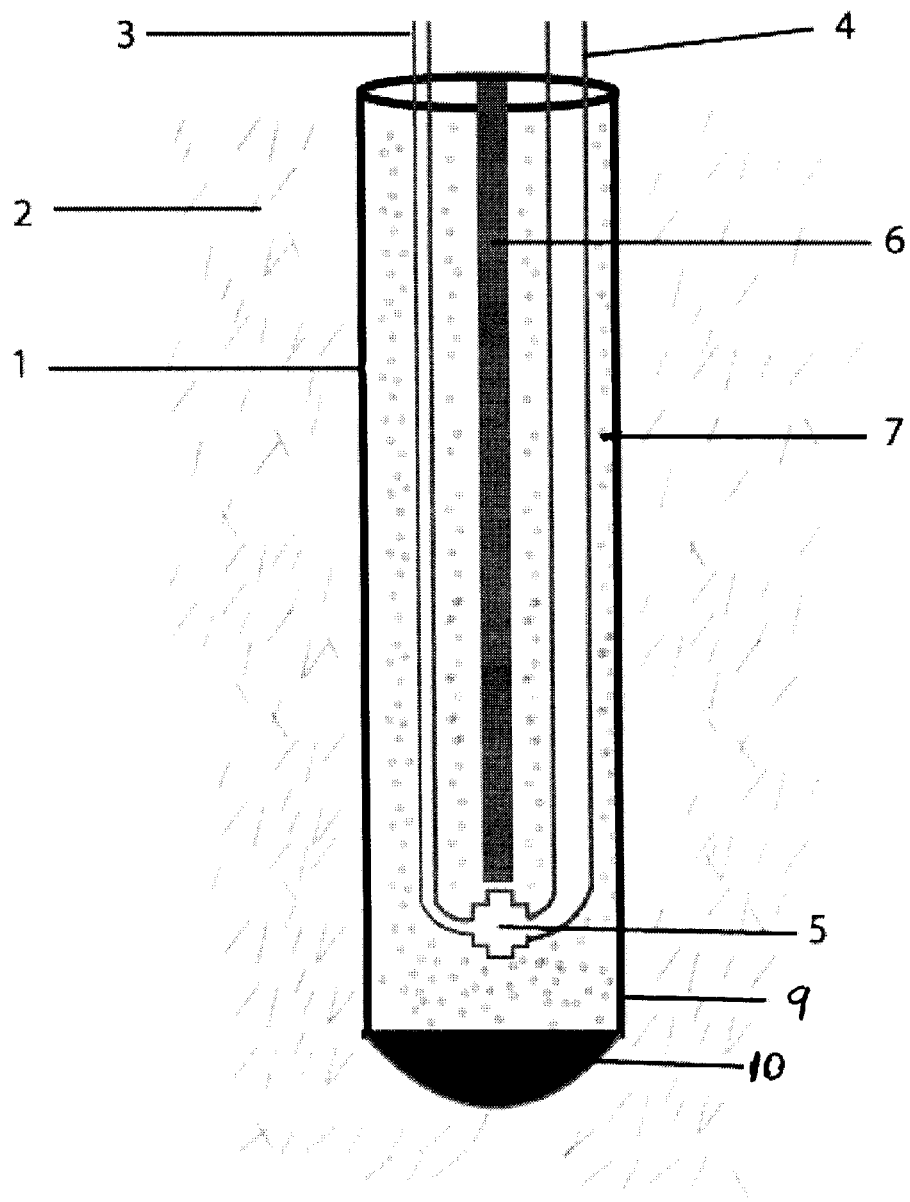
FIG. 6 is a side isometric view of a thermally conductive walled tube, in direct thermal contact with the ground, which tube has a sealed lower base, and which tube contains a geothermal fluid supply line and a geothermal fluid return line, where the two respective lines are separated by insulation extending across the diameter of the tube, and where both respective otherwise void spaces in the tube containing the two respective lines are filled with a non-corrosive, heat conductive fill material which fully encases both the fluid supply and the fluid return lines, and which tube is placed within a borehole in the ground.

FIG. 6 shows a side isometric view of a thermally conductive walled tube 9, in direct thermal contact with the ground 2, which tube 9 has a sealed lower base 10, and which tube contains a geothermal fluid supply line 3 and a geothermal fluid return line 4 connected by means of a coupling devise 5, where the two respective lines, 3 and 4, are separated by insulation 6 extending across the diameter of the tube 9, and where both respective otherwise void spaces in the tube 9 containing the two respective lines, 3 and 4, are filled with a non-corrosive, heat conductive fill material 7 which fully encases both the fluid supply line 3 and the fluid return line 4, and which tube 9 is placed within a borehole 1 in the ground 2.

Although particular embodiments of a system and method to enhance the operational efficiencies and installation cost functionality of geothermal heat exchange installations are described, it is not intended that such description be construed as limiting the scope of this invention, except as set forth in the following claims.

What is claimed is:

1. A geothermal heat exchange unit comprising at least one sub-surface fluid transport supply line and at least one sub-surface fluid transport return line, with the at least one fluid transport supply line and the at least one fluid transport return line being separated from each other by means of a thermal insulation material, but where the at least one fluid transport supply line and the at least one fluid transport return line are in thermal contact with respective adjacent sub-surface geothermal mass surroundings by means of a non-corrosive, thermally conductive, fill material inserted as necessary to fill any void space in the areas where the respective at least one fluid transport supply line and the respective at least one fluid transport return line are located between the thermal insulation material and the adjacent sub-surface geothermal mass surroundings.

2. The geothermal heat exchange unit of claim 1 where the unit is placed within a cylindrical borehole.

3. The geothermal heat exchange unit of claim 2 wherein the thermal insulation material, separating the at least one fluid transport supply line and any of its surrounding heat conductive fill material from the at least one fluid transport return line and any of its surrounding heat conductive fill material, incorporates a thermally insulating center, which center is expanded in size, so as to decrease the necessary amount of heat conductive fill material, and so as to increase the thermal insulation capacity.

4. The geothermal heat exchange unit of claim 2 wherein the thermal insulation material, separating the at least one fluid transport supply line and any of its surrounding heat conductive fill material from the at least one fluid transport return line and any of its surrounding heat conductive fill material, incorporates a thermal insulation material segment, which segment does not exceed a top view width in excess of one-third of the diameter of any borehole.

5. The geothermal heat exchange unit of claim 1 where the unit is placed within an excavated trench.

6. The geothermal heat exchange unit of claim 1 where the unit is placed within a tube, which tube has thermally conductive walls, and which tube with thermally conductive walls has a sealed lower base.

7. The geothermal heat exchange unit of claim 6 where the unit is placed within a cylindrical borehole.

8. The geothermal heat exchange unit of claim 6 where the unit is placed within an excavated trench.

9. The geothermal heat exchange unit of either claim 2 or claim 6 wherein the thermal insulation material, separating the at least one fluid transport supply line and any surrounding heat conductive fill material from the at least one fluid transport return line and any surrounding heat conductive fill material, is, at a minimum, at least three times as long, as measured from one side to the other side, as the larger of the diameter of the largest fluid transfer line and the combined diameters of any multiple fluid transfer lines on either respective side of the central thermal insulation material, but where the thermal insulation material always extends across the entire inside diameter of the borehole or casing whenever the said minimum design length is exceeded by the inside diameter of the borehole or casing.

10. The geothermal heat exchange unit of either claim 2 or claim 6 wherein the thermal insulation material, separating the at least one fluid transport supply line and any surrounding heat conductive fill material from the at least one fluid transport return line and any surrounding heat conductive fill material, is, at a minimum, at least three times as long, as measured from one side to the other side, as the larger of the diameter of the largest fluid transfer line and the combined diameters of any multiple fluid transfer lines on either respective side of the central thermal insulation material, but where, in the presence of corrosive sub-surface conditions, the length of the thermal insulating material only extends to within one-half inch to one inch of the diameter of the outside perimeters of any borehole or casing which contains the fluid supply and return lines as well as which contains the shortened central insulation, so that the thermally conductive fill material, which is of a non-corrosive composition, forms a complete protective shell against corrosion around the fluid transport lines and their central insulation against corrosion.

11. The geothermal heat exchange unit of claim 1 wherein the thermal insulation material, separating the at least one fluid transport supply line and any surrounding heat conductive fill material from the at least one fluid transport return line and any surrounding heat conductive fill material, is, at a minimum, at least three times as long, as measured from one side to the other side, as the larger of the diameter of the largest fluid transfer line and the combined diameters of any multiple fluid transfer lines on either respective side of the central thermal insulation material.

12. The geothermal heat exchange unit of claim 1 wherein the said geothermal heat exchange unit is connected by means of common supply and return fluid lines to other geothermal heat exchange units.

13. The geothermal heat exchange unit of claim 1 wherein said respective geothermal heat exchange unit is connected to a closed-loop water-source heat pump.

14. The geothermal heat exchange unit of claim 1 wherein said respective geothermal heat exchange is connected to a closed-loop direct expansion heat pump.

15. The geothermal heat exchange unit of claim 1 wherein said respective geothermal heat exchange unit is connected to a closed-loop air-source heat pump.

* * * * *